United States Patent [19]

Meyer et al.

[11] 3,881,761
[45] May 6, 1975

[54] AUTOMATIC MECHANICAL TONGS WITH OPEN AND CLOSED STABLE POSITIONS

[75] Inventors: André Meyer, Chatenay-Malabry; Roger Gérard, Chevilly-Larue, both of France

[73] Assignee: Groupement Atomique Alsacienne Atlantique, Le Plessis, Robinson, France

[22] Filed: Dec. 3, 1973

[21] Appl. No.: 421,184

Related U.S. Application Data

[63] Continuation-in-part of Ser. No. 193,266, Oct. 28, 1971, abandoned.

[30] Foreign Application Priority Data
Oct. 29, 1970 France .............................. 70.39013

[52] U.S. Cl. .................................. 294/88; 294/106
[51] Int. Cl. .................................... B25b
[58] Field of Search ........ 294/106, 110 R, 115, 119, 294/104, 100, 83 R, 83 A, 88; 269/201, 228

[56] References Cited
UNITED STATES PATENTS
2,677,981  5/1954  Temple ............................... 269/228
3,245,346  4/1966  Schvetzler ..................... 294/83 R X Primary Examiner—Evon C. Blunk
Assistant Examiner—Joseph E. Valenza
Attorney, Agent, or Firm—Sughrue, Rothwell, Mion, Zinn & Macpeak

[57] ABSTRACT

Mechanical automatic bistable tongs with a view to the manipulation of cylindrical objects with a very elongated shape, such as tubes, pipes, rods, etc., permitting the pickup of these pieces at a very specific place and the depositing of these pieces at a predetermined place, with precision. The tongs include means for opening and closing the jaws, activated by jacks. The action of the jacks moves a slide which causes a system of connecting rods to move from one stable position to another stable position, bringing about the opening or closing of the tongs respectively.

2 Claims, 3 Drawing Figures

AUTOMATIC MECHANICAL TONGS WITH OPEN AND CLOSED STABLE POSITIONS

This application is a continuation-in-part application of Ser. No. 193,266 filed on Oct. 28, 1971, now abandoned, entitled "Grouping of Automatic Bistable Tongs."

BACKGROUND OF THE INVENTION

Field of the Invention

This invention concerns mechanical automatic bistable tongs for the manipulation of cylindrical objects with a very elongated shape, such as drill rods.

SUMMARY OF THE INVENTION

The mechanical automatic tongs are intended to grasp cylindrical objects with an elongated shape, and are very simple to make and the cost is very low. The mechanical automatic bistable tongs are constituted by a framework in which there are connecting rods forming knuckle-joints, with means transforming the transversal movement into an opening and closing movement for the jaws of said tongs. A device for the control of the movement of the connecting rods is constituted by a slide with a transversal run, limited by stops, moving along, in the course of its movement, two sets of connecting rods and comprising, in its center, two cylindrical pistons, prolonged at their ends by cylindrical elements with a smaller diameter, each of said pistons being susceptible to moving with respect to the slide by an amplitude sufficient for partly disengaging the cylindrical portion with the large diameter, characterized by the fact that, when the slide is at a stop, the large-diameter cylindrical portion of one of the pistons blocks a set of balls in a housing that is in one piece with the framework and keeps said slide and the tongs in a stable position.

The slide is locked by changing the position of the connecting rods forming knuckle-joints. The slide locking safety is constituted by the fact that the cylindrical, large-diameter portion of the piston applies the balls in a housing that is a part of the framework. This locking safety is obtained with the help of two springs which hinder the movement of the pistons. Thus, a piston can move only if it is subjected to an effort greater than the opposing action of its spring, and the balls can then become lodged opposite the smaller diameter portion of the piston and can release the slide.

BRIEF DESCRIPTION OF THE DRAWINGS

Thus, the advantages and features of the device involved in the invention will emerge from the description of the tongs given here by way of example and without any restrictions, reference being made to the FIGURES attached hereto, showing a cross-section of the tongs, as used in a device according to the invention.

DESCRIPTION OF THE PREFERRED EMBODIMENT

Figure 1:
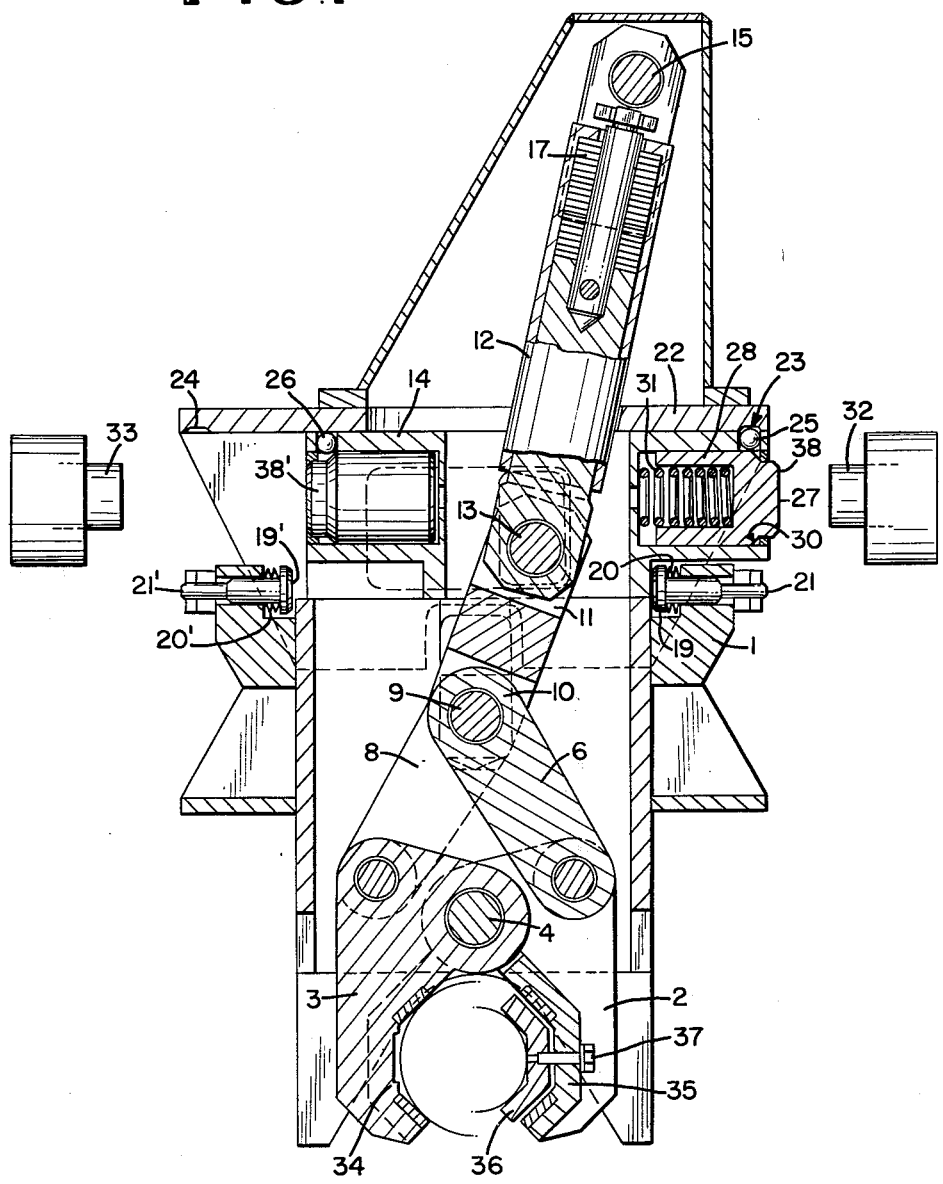
FIG. 1 is a cross sectional view of one embodiment of the tongs of the present invention with bistable open and closed positions.

These tongs essentially involve a framework 1, equipped at its end, with two jaws 2 and 3, articulated on shaft 4 affixed relative to framework 1. A system of small connecting rods 6 and 8 makes it possible to open or close the jaws when the common axis defining a first knuckle joint 9 of said small connecting rods moves longitudinally, a slight movement of the knuckle joint downward tending to close the jaws 2 and 3. The movement of joint 9, in turn, results from the action of two connecting rods 11 and 12, forming a second knuckle joint, whose common axis 13 is moved in a limited transversal movement by slide 14 and brings about the closing or opening of the tongs. The telescoping connecting rod 12 is supported on axis 15 in the upper portion of framework 1 and oscillates within cylindrical piece 22 driven by slide 14, through which the joined portions of the rods 11 and 12 extend. This connecting rod is equipped with a spring jack 17 which permits axis 13 to move aside sufficiently to permit the overstepping of the straight line joining axes 9 and 15 while ensuring the effort necessary to retain the load grasped by the jaws of the tongs.

The course of slide 14 is limited by two stops 19 and 19', equipped with springs 20 and 20', and tension regulating devices 21 and 21'.

Slide 14 moves in a cylindrical piece 22 which comes in one piece with and which is a part of the framework; this cylindrical piece 22 has, at its two ends, housings 23 and 24, for balls, such as 25 and 26. Furthermore, the slide itself is in one piece with the balls which it moves with the help of the drilling 25' and 26' along as it is displaced.

The central portion of the slide consists of two pistons 27 and 27'. Each includes a cylindrical portion 28, 28' with a diameter equal to the one of its housing in the slide 14 and at the two ends, a likewise cylindrical portion, although with a smaller diameter, 38, 38', leaving a certain leeway in housing 22 between pistons 27, 27' and slide 14. The two cylinders, in each case, are connected by truncated cone 30, 30'. The interior of each piston is hollow and receives a spring, such as 31, 31' resting, on the one hand, on slide 14 and, on the other hand, on the bottom of the cavity hollowed out in piston 27, 27'.

Figure 2:
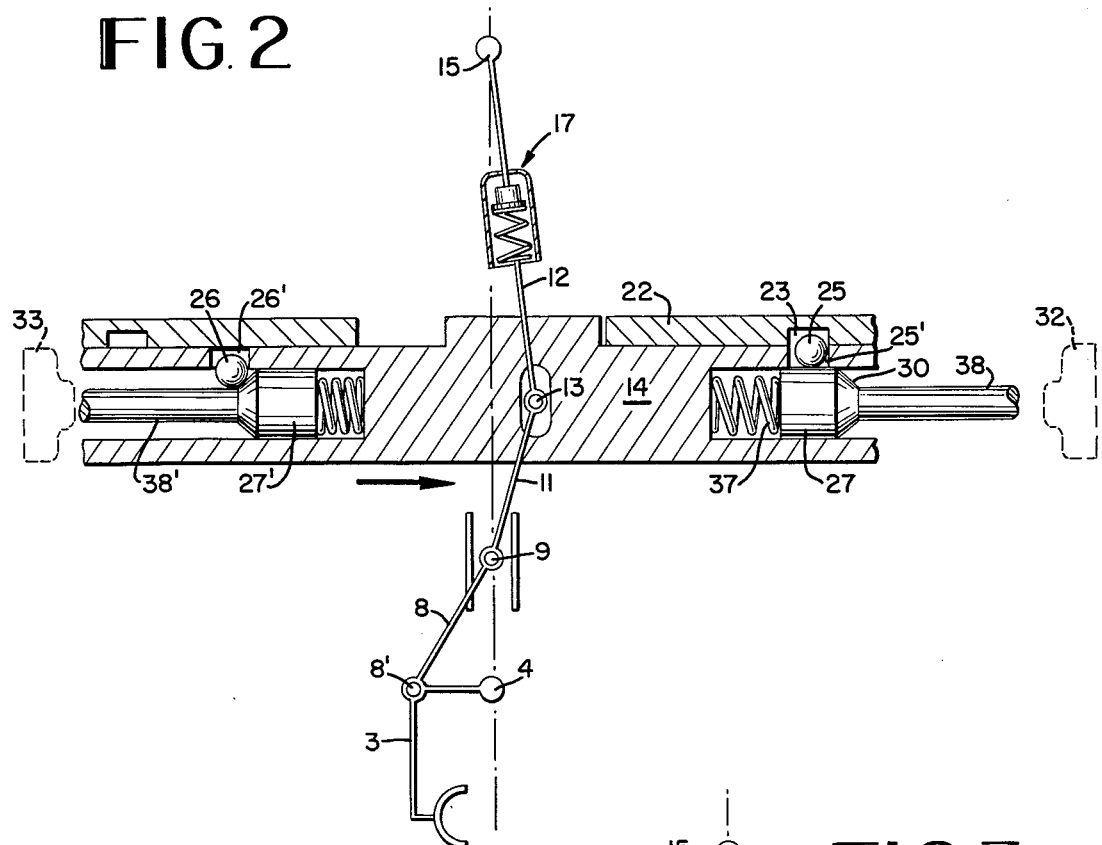
FIG. 2 is a partial, diagrammatic sectional view of the tongs of FIG. 1, in jaw closed position.
Figure 3:
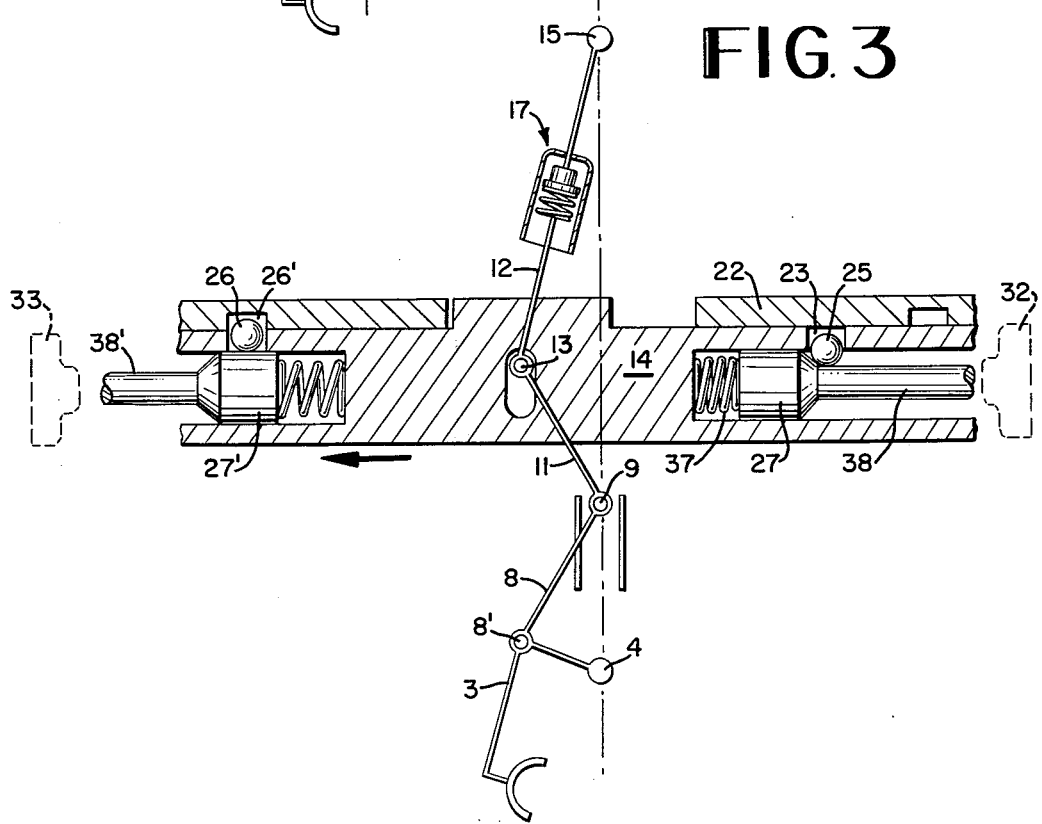
FIG. 3 is a similar, partial, diagrammatic, sectional view, to that of FIG. 2, with the jaws in open position.

The operation of the assembly will be understood according to FIG. 2. Opposite each piston, there is a jack, such as 32 or 33 external to the invention. Due to the action of the jacks, the slide is moved, the closed tongs are opened and the opened tongs are closed, respectively bringing about the release or the pickup of an elongated cylindrical element, such as metal tube. The tongs opening or closing mechanism operates as follows: if one looks at the tongs in the position as indicated in FIG. 2, then a movement of piston 32 toward the left, first of all compresses the opposing spring 31, and then the piston comes to rest against the slide, the ball 25 is placed before, or in front of flange 30 and then in front of the smaller-diameter cylinder 31, and ball 25 can then come out of its housing 23 and unblock the movement of the slide. The movement then continues due to the thrust of jack 32 until the moment the slide makes contact with the stop 19'. Ball 26 moves into housing 24 and blocks the slide. In the meantime, the knuckle joint at 13 moved along by the slide, is passed from the other side of the straight line formed by the centers of fixed axis 4 and 15, moving the small rods 8 and 6 back up. The jaw is open. According to FIG. 3, one can see that the action of jack 33 exerts an inverse effect. It should be noted that jaws 34 and 35, designed, for example, so as to pick up 5-inch pipes, can, by adding a supplementary jaw 36, connected to the main jaw by screw 37, pick up 3.5-inch pipes.

Although the device just described seems most advantageous for employing the invention in a particular technical situation, it will be understood that various modifications, both in the number of tongs to be attached to the beam, and in the number of pistons moving the slide of each tongs, can be introduced in the assembly without going beyond the frame work of the invention, certain of its elements being capable of being replaced by others which can perform an equivalent technical function.

What is claimed is:

1. An assembly for locking mechanical tongs at open and closed stable position, said assembly comprising:
   a framework;
   a pair of clamping jaws mounted for pivoting between open and closed positions above a fixed axis within said framework;
   a pair of connecting rods operatively coupled to said jaws and to an intermediate rod, and forming with said intermediate rod, a first knuckle joint slidable with respect to said framework;
   a spring jack rotatable about a second fixed axis within said framework;
   a sliding rod connected operatively on one side to said spring jack and on the other side to said intermediate rod forming with said intermediate rod, a second knuckle joint;
   a slide operatively coupled to said second knuckle joint and transversally movable within said framework between stops on either side of a straight line defined by said first fixed axis and said second fixed axis; and
   ball detent means carried by said slide for engaging said framework at positions defined by said stops to lock said slide with said second knuckle joint maintaining said jaws respectively in open and closed stable positions.

2. The assembly as claimed in claim 1 wherein:
   said framework comprises a cylindrical piece including at each end a ball receiving recess,
   said slide comprises a cylindrical member concentrically positioned within said cylindrical piece and bearing at each end a ball receiving recess,
   said ball detent means comprising further at each end of said cylindrical member of the slide, spring biased pistons having an internal portion of the same diameter as their housing and an external portion with a smaller diameter leaving a leeway in its housing;
   whereby, said slide tending to remain in a fixed position with respect to the framework when the larger portion of the pistons is facing said drillings of the slide and tends to be free to slide when the piston is pushed by an external force compressing said spring and when the smaller portion of the piston is facing said recess of the slide.

* * * * *